INVENTOR.
CHESTER O. MERCHANT
DOUGLAS L. SWANSON
BY
ATTORNEY

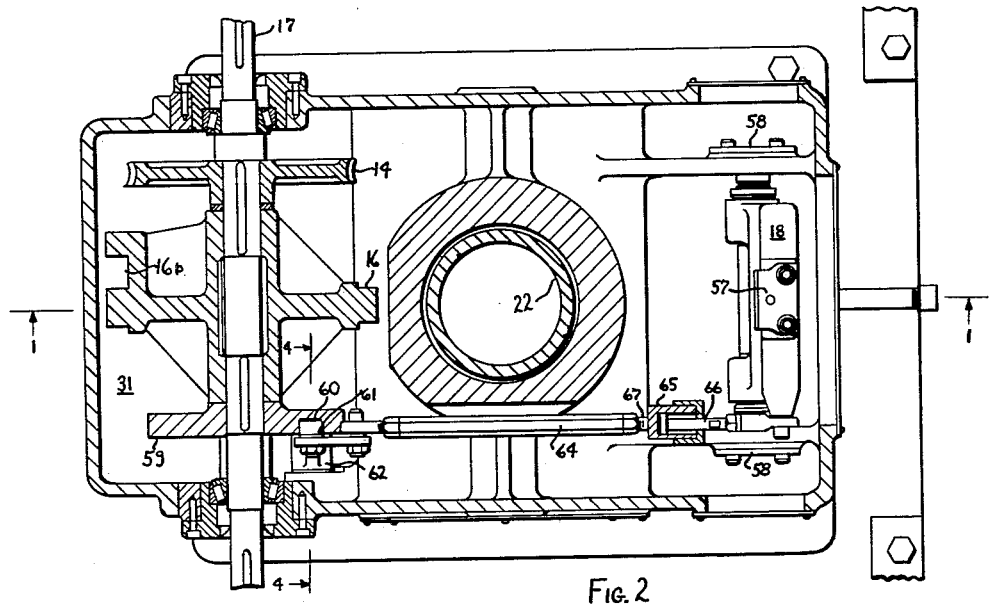
Fig. 2
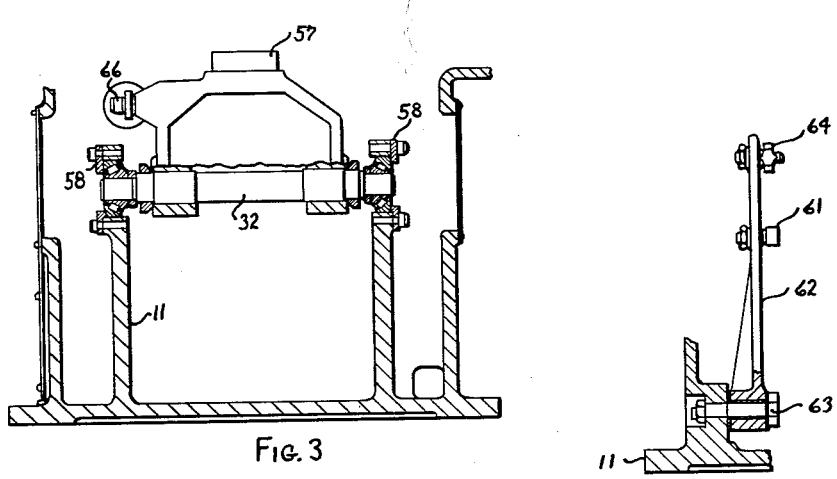
Fig. 3
Fig. 4

INVENTOR.
CHESTER O. MERCHANT
DOUGLAS L. SWANSON
BY
ATTORNEY

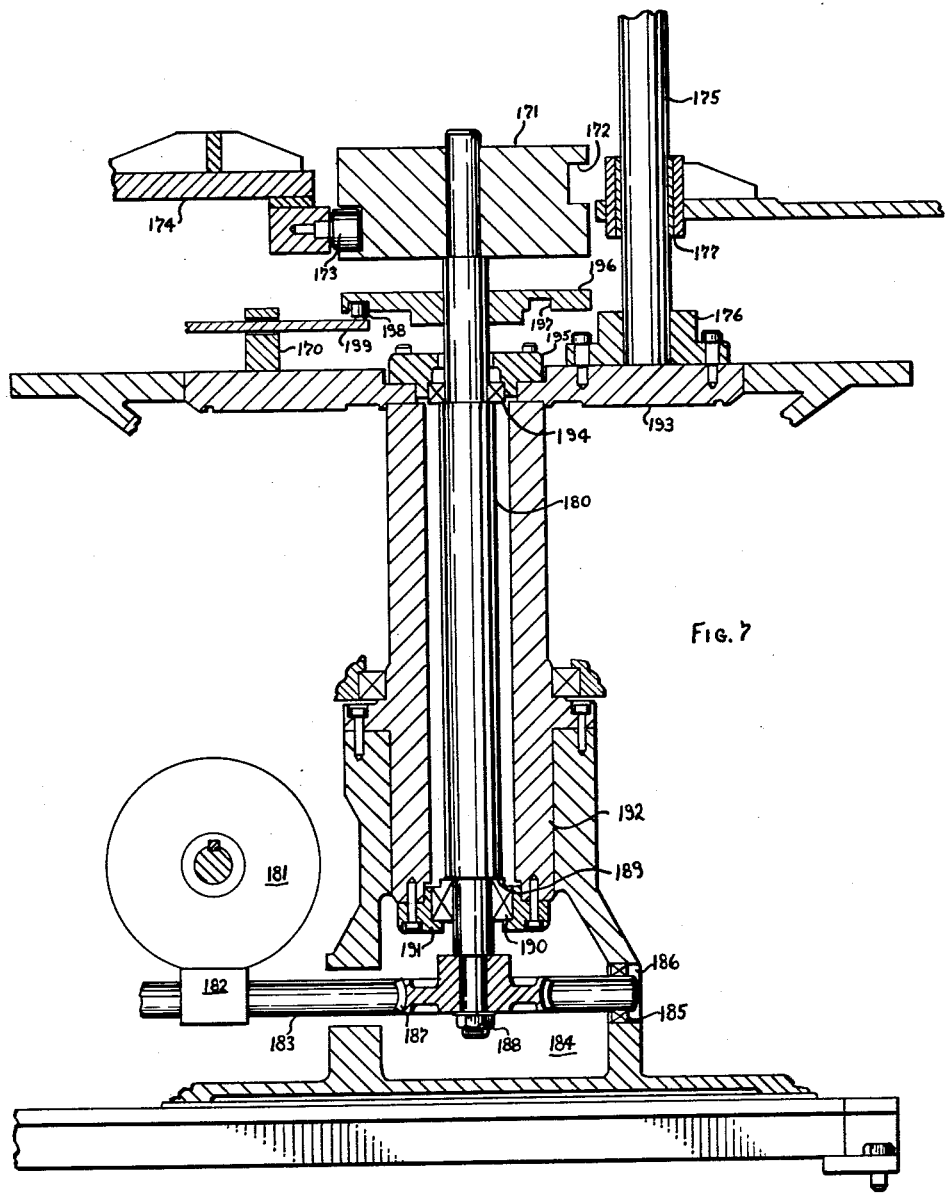

Aug. 11, 1964  D. L. SWANSON ETAL  3,143,792
ASSEMBLY MACHINE
Filed May 28, 1962  6 Sheets-Sheet 6

INVENTORS
CHESTER O. MERCHANT
BY DOUGLAS L. SWANSON
Charles L. Lovercheck
Attorney United States Patent Office 3,143,792
Patented Aug. 11, 1964

3,143,792
ASSEMBLY MACHINE
Douglas L. Swanson and Chester O. Merchant, Erie, Pa., assignors to Swanson-Erie Corporation, Erie, Pa., a corporation of Pennsylvania
Filed May 28, 1962, Ser. No. 198,350
22 Claims. (Cl. 29—208)

This invention relates to assembly machines and, more particularly, to the type of machines used in manufacturing operations; for example, in assembling parts in modern industry.

This application is a continuation in part of patent application, Serial No. 812,032, filed May 8, 1959, now abandoned.

Frequently, in the assembly of articles of manufacture in modern high production industrial plants, it is desirable to have a machine with a fixed central plate like table with a rotatable table supported thereon and rotatable thereabouts and with means movable upwardly and downwardly in the fixed table relative to the movable table. There is no efficient machine of this type available at the present time which has all of the advantages of the machine disclosed herein. Further, the present invention provides an indexing means for moving the outside table around the central fixed table a predetermined amount during predetermined times.

The present machine provides a rotatable table and a reciprocable support which are coextensive to each other and parallel to each other. The reciprocable support extends up through the center of the rotatable table and provides a support surface for tools to process articles of manufacture supported on the rotatable table. In its more specific form, the rotatable table is supported on the machine concentric to a fixed table and the fixed table is suitable for supporting tools also.

It is, accordingly, an object of the present invention to provide a machine to carry out the above purposes and, further, it is an object of this invention to provide a machine which is simple in construction, economical to manufacture, and simple and efficient in operation.

Another object of the invention is to provide an improved assembly machine.

A further object of the invention is to provide an improved assembly machine having a central fixed portion with a vertically movable member thereon having an outside flange for supporting tools and a rotatable table for indexing rotation around the fixed table, all movable in synchronized relation to each other.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 2 is a cross sectional view taken on line 2—2 of FIG. 1;

FIG. 3 is a view taken on line 3—3 of FIG. 1;

FIG. 4 is a view taken on line 4—4 of FIG. 2;

FIG. 7 is a cross sectional view of another embodiment of the invention; and

Figure 1:
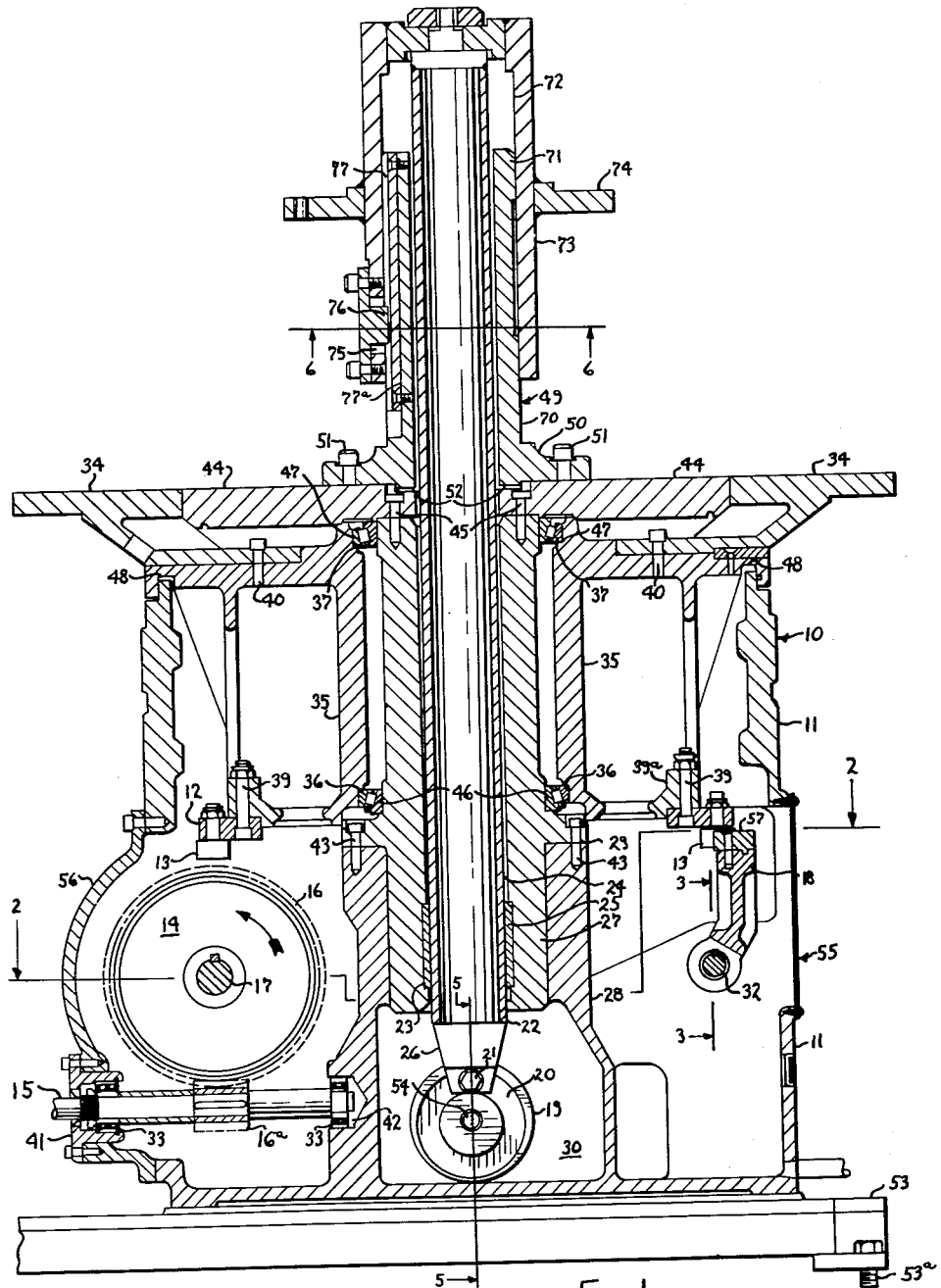
FIG. 1 is a cross sectional view taken on line 1—1 of FIG. 2.

Now with more particular reference to the drawings, the embodiment of the invention shown in FIGS. 1 to 6 discloses a machine indicated at 10. The machine 10 has a housing 11 fabricated from a steel casting or the like with access openings covered by plates 55 and 56. The housing 11 has a base 53 for supporting it on a machine table or the like by means of bolts 53a.

The base 53 is made up of a support 28 for a core 27 which is hollow and has a flange which is supported on a shoulder 29 and fastened thereto by means of bolts 43. The upper end of the hollow core 27 supports an inner table 44 which is attached thereto by means of bolts 45 which have countersunk heads as shown. An upper housing 49 is hollow and has an outwardly extending flange 50 bolted to the inner table 44 by means of bolts 51.

An intermediate table support 35 is hollow and receives the core 27. The intermediate support 35, is, in turn, supported on bearings 36 and 37 which are made as thrust bearings in the case of the bearing 36 and roller bearings in the case of the bearing 37. The bearings 36 and 37 are received in recesses 46 and 47 in the support 35 and they freely rotate thereon. The outwardly extending flange of the support 35 has a groove 48 which receives the upper end of the housing 11. An outwardly extending flange 39a radiates from and is attached to the support 35. The upper supporting bearing 37 receives the hollow cylindrical fixed core 27 and supports a table 34 which is attached to the outwardly extending flange of the support 35 by means of bolts 40. The bolts 40 extend through a downwardly and inwardly extending flange which is fixed to the lower side of the table as shown. The top surface of the table 34 is an annular flat surface which is rotatable around the fixed inner table 44.

An annular ring 12 is fixed to the outwardly extending flange 39a of the support 35 by means of bolts 39 spaced around the under periphery thereof. The ring 12 has peripherally spaced rollers 13 on the lower outer peripherally thereof. The ring 12 is received in a recess in the outwardly extending lower flange of the support 35. The rollers 13 are received in a spiral outer peripheral groove in a cam wheel 16 and the cam wheel 16 is keyed to a shaft 17 as shown.

A shaft 15 is connected to a suitable driving means such as a gear motor and the shaft 15 is supported in bearings 33, one of which is supported in a recess 42 and the other of which is supported in a bearing member 41. The bearing member 41 is clamped to the plate 56 by means of bolts. The shaft 15 has a worm wheel 16a thereon. A worm gear 14 engages the worm wheel 16a which is keyed to the shaft 15. The cam wheel 16 has an outer peripheral groove 16b which receives the rollers 13.

A positioning member 18 is swingably supported on a shaft 32 and has a wedge member 57 fixed to the upper end thereof. The outside edges of the wedge member 57 converge to wedge between the rollers 13. The ends of the shaft 32 are received in bearings 58 which are bolted to the webs of the housing 11 as shown. The wedge member 57 is forced between two adjacent rollers 13 when the table stops between indexing movements.

A cam wheel 59 has a laterally disposed slot 60 therein which receives a roller 61. The roller 61 is rotatably supported on a swinging lever 62. The lever 62 is swingably supported to the housing 11 by means of a bolt 63. The upper end of the lever 62 has a link 64 pivotally connected thereto. The link 64 has the opposite end thereof fixedly connected to a bifurcated member 65 which receives an eye member 66 which is fixed to the member 18. The length of the link 64 is adjustable by means of a bolt and nut arrangement 67.

An upper housing 49 forms a guide for a table support 73. The core 27 has an aligned bore therein which receives a hollow shaft 22. The hollow shaft 22 is slidably disposed in a bushing 25 which is fixed on the inside of the core 27 in an internal counterbore 23. The lower end of the shaft 22 has a tongue 26 fixed thereto and the lower end of the tongue 26 has a cam member 21 supported thereon. The cam member 21 is received in a cam groove 20 which is formed in the lateral side of a cam 19. The groove 20 has its center offset from a shaft center 54. The core 57 has a bore 24 therein which receives the shaft 22. The upper end of the shaft 22 extends through the upper end of the bore in the upper housing 49. The cam 19 is supported in a cavity 30 and the cam wheel 59 and worm wheel and gear assembly are supported in a cavity 31.

The inner table 44 has a counterbore 52 therein which receives a downwardly extending member on the lower end of the upper housing 49. The laterally disposed flange 50 is supported on the inner table 44 and held thereto by the bolts 51. The shaft center 54 which carries the cam 19 is supported in spaced bearings in the housing 11.

The outer periphery of the upper housing 49 has an outside machined cylindrical surface 70 at the lower end thereof and a surface 71 at the upper end thereof. The surfaces 70 and 71 are snugly received in an inner machined surface 72 of the table support 73. The table support 73 has an intermediate flange 74 welded thereto and extending therearound for supporting tools. A movable table is attached to the flange 74. Tools are attached to the movable table to process articles in article supports. The movable table has a vertically extending cylindrical surface also for supporting tools.

The table support 73 has a hole 75 therein which receives a key member 76. The key member 76 is slidable vertically in a line 77a disposed in a slot 77 in the outer periphery of the upper housing 49. The key member 76 is bolted to the table support 73 by means of spaced bolts and thereby holds it in position. The key member 76 prevents the table support 73 from rotating relative to the inner table 44.

During operation, the shaft 15 is driven at a constant speed which rotates the worm gear 14 at a constant speed and, with it, the wheels 59 and 16a. The outer peripheral groove 16b receives one of the rollers 13 at a time. Therefore, each complete revolution of the gear 14 will cause the table to rotate an angular amount equal to the spacing of the rollers 13. Thus, the table 34 will rotate relative to the fixed table 44 and to the upper housing 49.

On each rotation of the shaft 15, the cam wheel 59 will also rotate an equal angular amount and it will swing the wedge member 57 out from between two cam members and back into the next two cam members to lock the rotating table in position. Also, the cam 19 will rotate, causing the table support 73 to move up and down once in timed relation to the rotation of the shaft 32 for each complete rotation of the cam 19. Therefore, by supporting work to be processed on the table 34 and tools on the fixed table 44 and the flange 74, the work can be moved relative to the fixed and upwardly and downwardly moving tools.

In the embodiment of the invention shown in FIG. 7, a shaft 180 rotates instead of oscillating up and down as in FIG. 1. The shaft 180 is driven at a constant speed. A gear 181 is turned by a worm gear 182 which is attached to a drive shaft 183. The drive shaft 183 extends into a gear housing 184 and is supported in a bearing 185 which is located in an opening 186 of the gear housing 184. Attached to the drive shaft 183 inside of the gear housing 184 is a worm wheel which communicates with a worm gear 187 which is attached to the bottom of the shaft 180 by a nut 188.

The shaft 180 has a smaller diameter directly above the gear 187 which is smaller than the body of the shaft 180 and terminates in an annular shoulder 189. A bearing 190 receives the shaft 180. The bearing 190 is supported by a bearing ring support 191 which is bolted to the bottom of a core 192. The core 192 extends upwardly and is bolted to the underside of an inner table 193.

The shaft 180 is machined down where it passes through a bearing 194 to form an annular shoulder which receives the bearing 194 which is held in position by a bearing ring clamp 195. The ring clamp 195 has bolts which extend down through the ring clamp 195, the inner table 193, and into the upper annular surface of the core 192 holding the bearing 194 in its proper position. The shaft 180 extends upwardly from the ring clamp 195 and a cam 196 is attached thereto. The cam 196 has an underside eccentric annular groove 197 machined therein. A roller 198 rides inside of the groove 197 and is attached to an arm 199 which is slidably contained in an arm support 170.

As the shaft 180 turns the cam 196, the roller 198 follows the off center annular groove 197, causing the arm 199 to slide in an inward and then outward movement.

The shaft 180 has another shoulder adjacent the reduced size end and received in a cam 171. The cam 171 has a peripheral groove 172 which spirals upwardly and then downwardly so that when it is rotated, the cam 171 causes a roller 173 which rides therein to rise and then lower. The roller 173 is attached to a table 174. On the opposite side from the roller 173 is a column 175 which is received in and supported by a pedestal 176 which is bolted onto the inner table 193.

The column 175 extends up through a sleeve bearing 177 which is attached to the table 174. Therefore, as the shaft 180 rotates, it turns the cam 171 and the groove 172 causes the roller 173 and the table 174 to rise and fall. The column 175 contained in the sleeve bearing 177 acts as a guide for the upward and downward movement of the table 174.

Figure 1A:
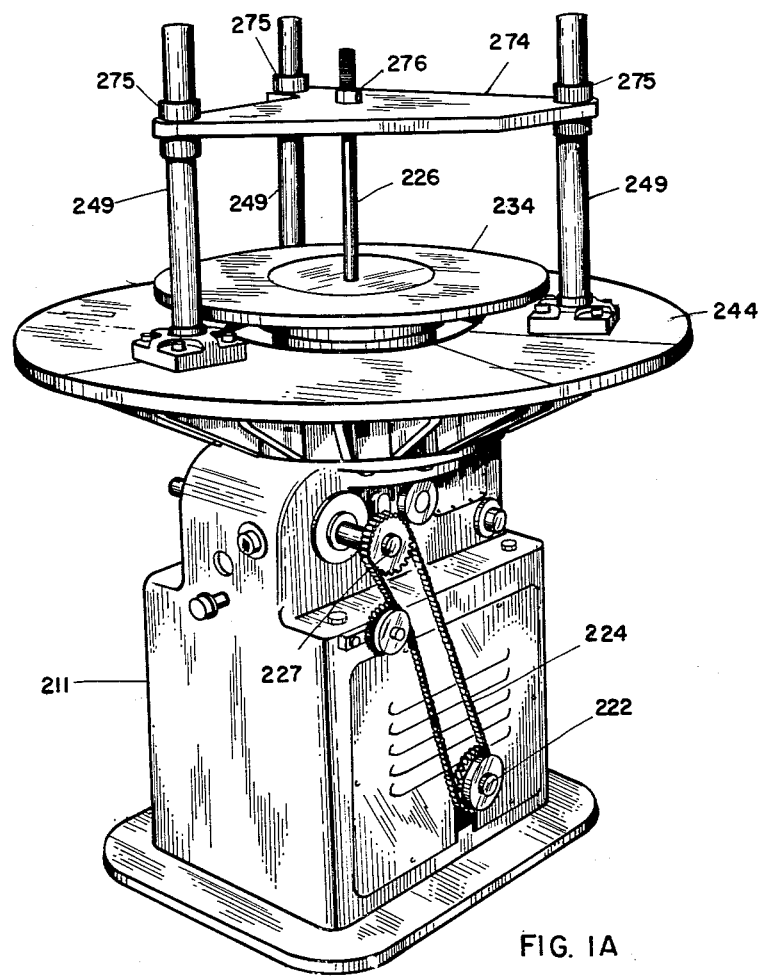
FIG. 1A is an isometric view of a machine according to the invention.
Figure 6:
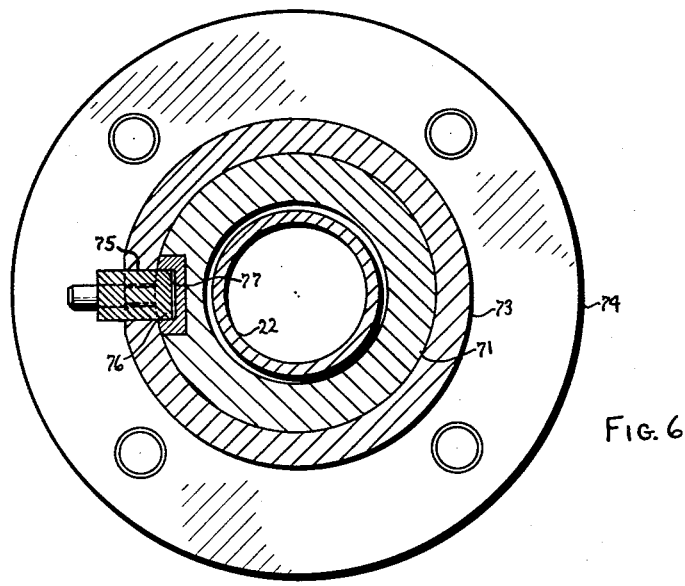
FIG. 6 is a cross sectional view taken on line 6—6 of FIG. 1.
Figure 5:
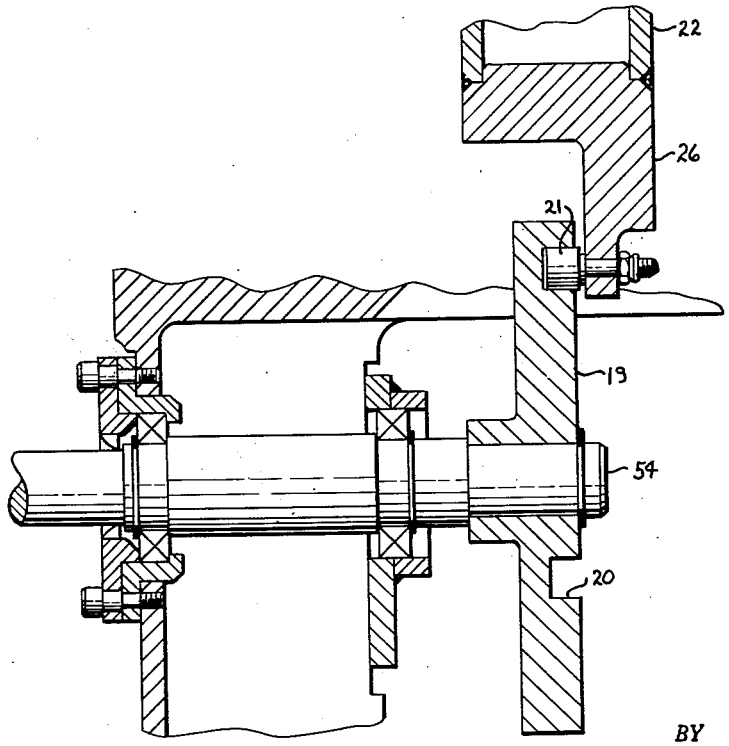
FIG. 5 is an enlarged cross sectional view taken on line 5—5 of FIG. 1.
Figure 8:
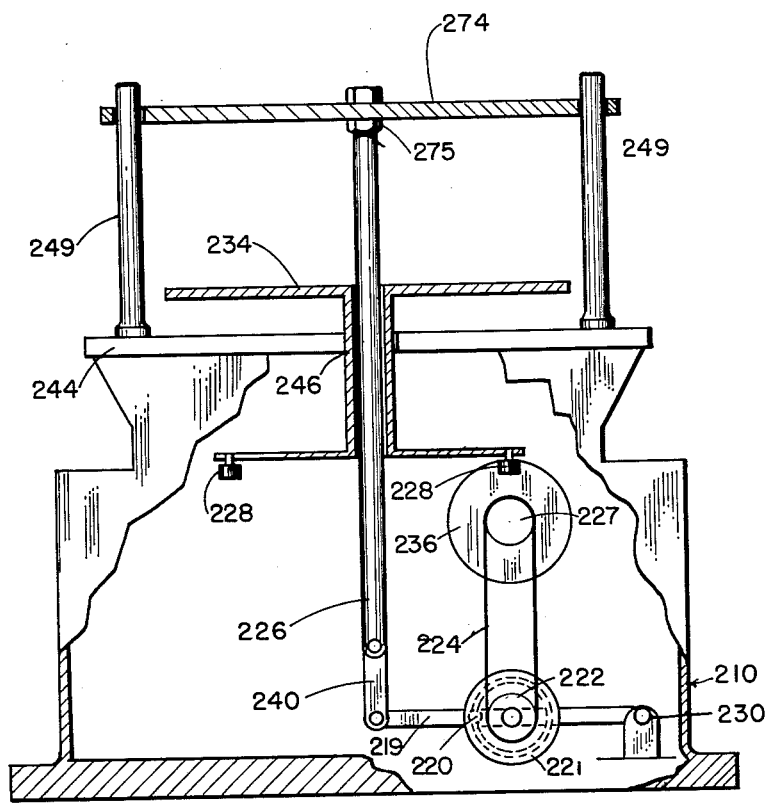
FIG. 8 is a view of the embodiment of the invention shown in FIG. 1A.

In the embodiment of the invention shown in FIGS. 1A and 8, a machine 210 is shown having a housing 211 with a fixed table 244 thereon. The fixed table has spaced upwardly extending columns 249 which are fixed to the table and extend upwardly therefrom and are slidably received in bosses 275 on a support plate 274. A rotatable table 234 is supported in bearings at 246 and the top of the table 234 is parallel to the plate 274.

A shaft 226 is slidably received in the table 234 and is fixed to the support plate 274 by nuts 276. The lower end of the shaft 226 is swingably connected to a link 219 and the link 219 has a cam follower 220 which is received in a cam slot 221 in the lift cam. The lift cam is rotatably supported on axis 222 which is, in turn, driven by a suitable motor.

A sprocket chain 224 extends around a sprocket on the shaft 226 and around a sprocket on a drive cam 236 which is supported on an axle 227 on the machine frame.

Spaced followers 228 are received in a peripheral spiral groove in the cam 236. For each rotation of the cam 236, the table 234 is rotatably advanced one position around the shaft 226.

The link 219 is swingably connected to the frame by means of a fulcrum point 230. Link 219 has the follower 220. The distal end of the link 219 is attached to the shaft 226 by means of a short link 240.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A machine of the class described comprising a frame, a hollow upwardly extending core member on said frame, said core member having vertically spaced bearing means thereon, a fixed inner table circular in shape supported at its center on the upper end of said core member, said inner table adapted to hold tools for processing work or articles to be processed having an annular outside peripheral surface, an annular outer table, a support member, said support member being supported on bearing means, said annular table being supported on said frame and disposed around said inner table with said core member at the center of said tables, a vertically extending shaft, said shaft extending through said core member and slidable vertically therein, a cam at the lower end of said shaft engaging said shaft to move it up and down, spaced rollers attached to said support member, and a cross-over cam having a spiral groove on its outside peripheral surface, said spiral groove advancing each said roller therethrough moving said outer table, said shaft and said outer table being movable in synchronism with each other.

2. The machine recited in claim 1 wherein said cross-over cam is disposed on a second shaft, a second cam attached to said second shaft, said second cam driving a third shaft up and down.

3. The machine recited in claim 1 wherein said shaft has a tubular support member disposed concentrically thereon and attached thereto, an upper housing slidably receiving said shaft and received in said tubular support member, said upper housing being attached to said inner table, a keyway in said housing extending upwardly thereon, and a key on said tubular support member and slidably received in said keyway.

4. The machine recited in claim 3 wherein an outwardly extending flange is attached to said first support member for supporting tools thereon.

5. A machine of the class described comprising a hollow core supported on said machine, a cam shaft disposed in a horizontal plane, a second shaft disposed parallel to said cam shaft, a rotatable table disposed on said core and rotatable thereon, an annular member attached to said table with said core at the center thereof, spaced followers on said annular member, a cam wheel on said cam shaft, said cam wheel having a spiral groove in its outer peripheral surface, said spiral groove receiving each said follower in turn to advance said annular member, a third vertically extending shaft slidably received in said core and at the center of said table, an upper housing supported on said core, said third shaft extending through said upper housing, a support disposed on said upper housing and attached to said third shaft, means to attach work or articles to be processed to said support, an annular table attached to said support and adapted to hold tools to process said work or articles, and cam means driven by said cam shaft to move said third shaft up and down in synchronism with said rotatable table.

6. The machine recited in claim 5 wherein the means to operate said third shaft comprises a second cam, a groove in one side of said second cam, a follower in said groove in said second cam, said follower in said groove in said second cam being connected to a lever on said second shaft.

7. A machine of the class described comprising a hollow core supported thereon, a first shaft disposed in a horizontal plane, a rotatable support disposed on said core and rotatable thereon and adapted to support work or articles to be processed attached to an annular member, spaced followers on said first shaft, said cam wheel on said first shaft, said cam wheel having a spiral groove in its outer peripheral surface, said spiral groove receiving each said follower in turn to advance said annular member, a second vertically extending shaft received in said core concentric to said annular member, an upper housing supported on said core, said second shaft extending through said upper housing, a tool support means to process said work and articles disposed on said upper housing, and means on said second shaft to reciprocate said tool support means relative to said articles.

8. The machine recited in claim 7 wherein said reciprocating means attached to said second shaft comprises a cam having means thereon to move a member on said machine to reciprocate said support.

9. The machine recited in claim 7 wherein said means on said second shaft comprises a cam having an outer peripheral cam surface and a member supported on said machine having a follower engaged by said cam whereby said member is moved up and down in synchronism with the rotation of said second shaft.

10. A machine for assembling articles of manufacture comprising a circular stationary table, a hollow member fixed to the center of said stationary table and extending downwardly therefrom, a rotatable table on said machine having circular edges concentric to said stationary table and rotatable around said stationary table, means on said rotatable table to support articles to be processed, a movable support member above said rotatable table and co-planar therewith and adapted to support tools to process articles supported on said rotatable table, a shaft disposed in said hollow member and rotatably supported thereon, means to rotate said shaft, a generally cylindrical cam on the upper end of said shaft, follower means on said movable support member engaging said cam reciprocating said table, index means connected to said table synchronized with said means to rotate said shaft, and means on said stationary table to process articles on said rotatable table.

11. The machine recited in claim 10 wherein said means on said stationary table to process articles comprises a cam on said shaft engaging followers on said stationary table, said followers actuating said means on said stationary table to process articles on said rotatable table.

12. In combination, a machine to assemble articles of manufacture and a drive means therefor, said machine comprising a first circular table and a second circular table disposed adjacent said first table and concentric thereto, said first table having spaced means thereon for assembling articles of manufacture, said second table having means to support tools to process said articles, drive means for said first table, said drive means comprising a vertically extending shaft, a generally horizontally disposed shaft, said horizontal shaft driving said first table, first gear means on said horizontal shaft, second gear means on said vertical shaft, and a third shaft having a first wheel engaging said first gear means and a second wheel engaging said second gear means whereby said horizontal shaft and said vertical shaft are driven together.

13. A machine for processing articles of manufacture comprising a table having a flat side and a circular periphery, means to rotate said table, means on said flat table side to support and secure in fixed positions the articles to be processed, a movable support, said movable support being adapted to support and secure in fixed position the processing means for said articles, said movable support having a surface disposed parallel to said table side and co-planar therewith and adapted to support said processing means for said articles, means to move said table with its flat side in a plane, means comprising a rigid elongated member extending through the center of said table and having means on its lower end for reciprocating said support toward and from said table, and means to synchronize the movement of said support with said table.

14. The machine recited in claim 13 wherein said elongated member comprises a shaft and a lever having one part thereof swingably connected to said shaft, one part thereof connected to a pivot on said machine, and cam means swinging said lever about said pivot point.

15. The machine recited in claim 14 wherein a stationary table is disposed generally concentric to said first mentioned table and inward from the outer edges thereof, and guide means on said stationary table for guiding said movable support.

16. The machine recited in claim 13 wherein said elongated member comprises a rotating shaft, and cam means on said shaft engaging follower means engaging said movable support whereby said means to support articles is reciprocated.

17. The machine recited in claim 16 wherein said cam means comprises a generally cylindrical member having said shaft extending through the axis thereof and fixed thereto, a spiral surface around said shaft on said cylindrical member, and a follower on said first table received on said surface.

18. The machine recited in claim 16 wherein a stationary table is disposed generally concentric to said first table and inward from the outer edges thereof.

19. The machine rectied in claim 18 wherein means for guiding said article support means is provided on a stationary table outward of said first table.

20. The machine recited in claim 13 wherein said means for reciprocating said movable support comprises cam means on said machine engaging said elongated member for reciprocating said movable support.

21. The machine recited in claim 20 wherein means is provided on said table outward of said movable support for guiding said movable support.

22. The machine recited in claim 20 wherein a stationary table is disposed generally concentric to said first table and inward from the outer edges thereof, and guide means is disposed on said stationary table inward of the outer edges thereof for guiding said movable support.

References Cited in the file of this patent

UNITED STATES PATENTS

| | | |
|---|---|---|
| 1,508,974 | Jackson | Sept. 16, 1924 |
| 2,028,225 | Larson | Jan. 21, 1936 |
| 2,493,206 | Okey | Jan. 3, 1950 |